G. P. FINNIGAN.
SYSTEM OF AUTOMATIC SPEED CONTROL.
APPLICATION FILED DEC. 29, 1914.
1,302,346.
Patented Apr. 29, 1919.
2 SHEETS—SHEET 1.
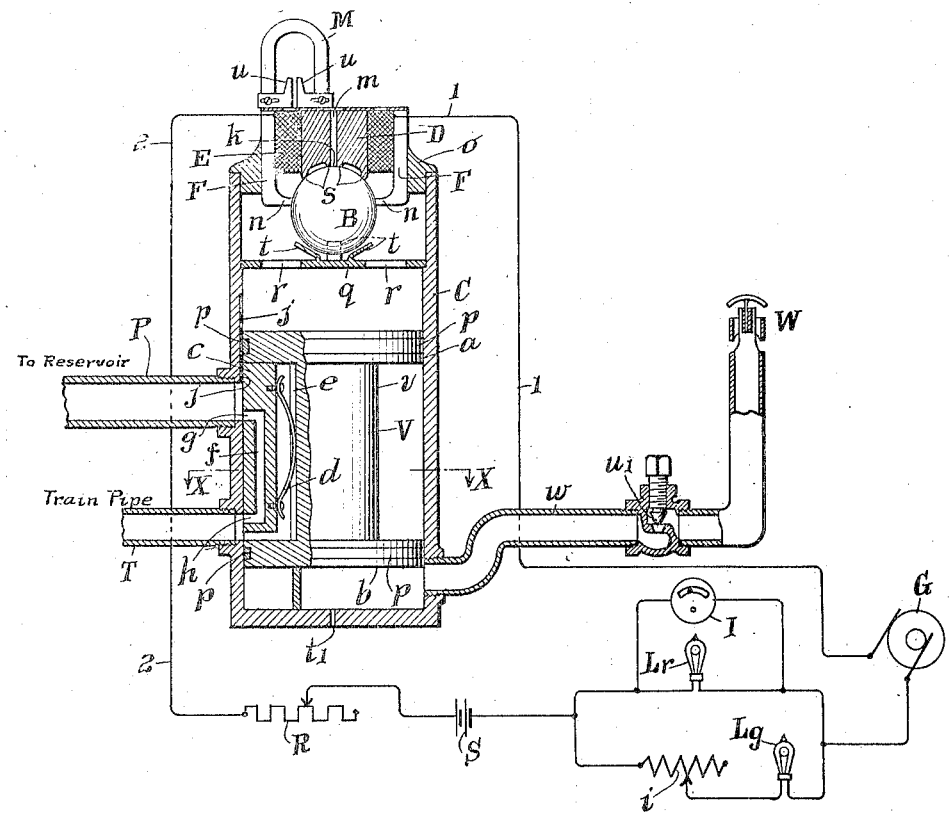
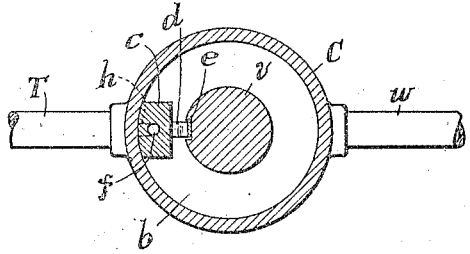

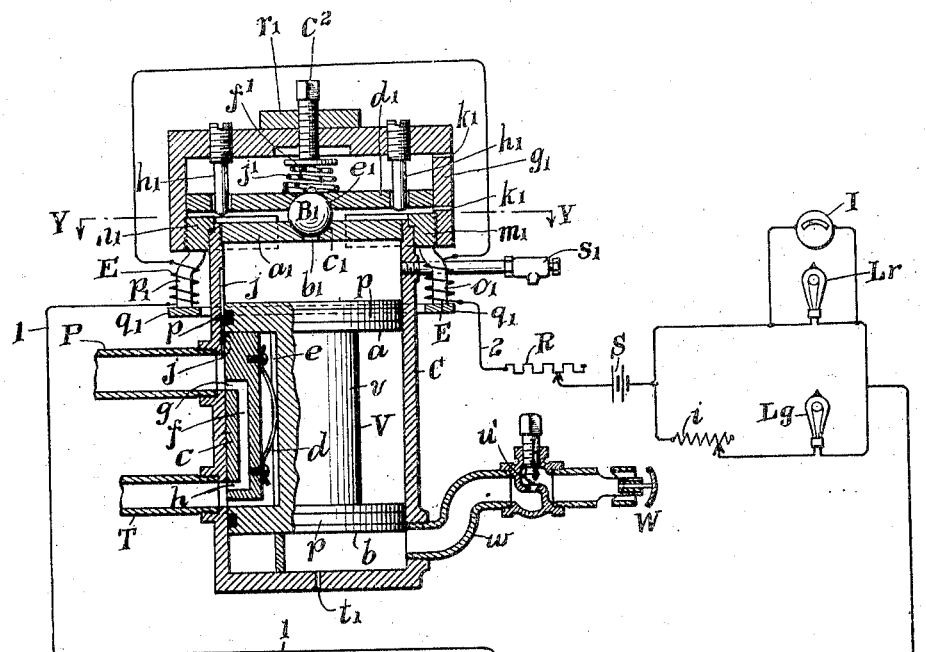
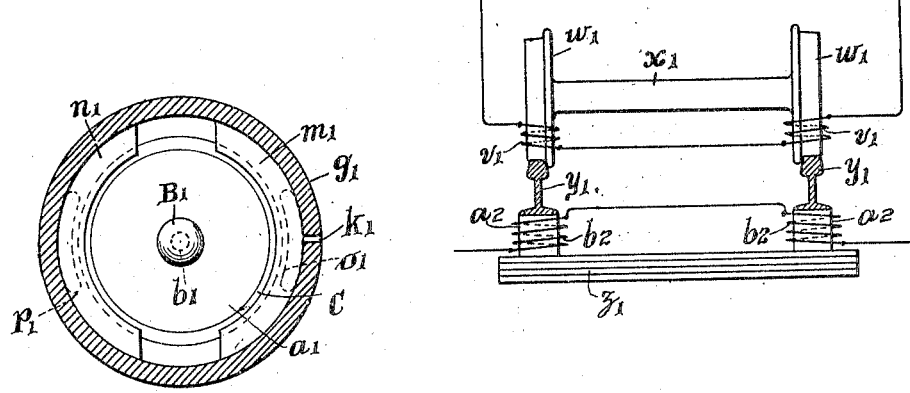

UNITED STATES PATENT OFFICE.

GEORGE P. FINNIGAN, OF WILTON-ON-JAMES, NEAR RICHMOND, VIRGINIA.

SYSTEM OF AUTOMATIC SPEED CONTROL.

1,302,346.   Specification of Letters Patent.   Patented Apr. 29, 1919.

Application filed December 29, 1914. Serial No. 879,431.

*To all whom it may concern:*

Be it known that I, GEORGE P. FINNIGAN, a citizen of the United States, residing at Wilton-on-James, near Richmond, Henrico county, State of Virginia, have invented certain new and useful Improvements in Systems of Automatic Speed Control, of which the following is a specification.

My invention relates to a system for automatically controlling the speed of a railway train or other moving vehicle.

My invention resides in a system for automatically controlling the speed of a moving train or vehicle as by automatically applying the brakes thereto when the speed exceeds a predetermined limit; and automatically releasing the brakes when the vehicle or train speed diminishes to a predetermined value.

In one of the forms my invention may take the air brakes are so automatically applied and later released, the control being effected by an electro-magnetically controlled valve which in turn controls brake setting and releasing valve mechanism.

My invention resides also in means, associated with the system of the character above referred to, for giving visual, audible or other indications to the vehicle driver that his vehicle or train has approached or exceeded a predetermined speed limit.

In a system of the character described, the electro-magnetic control may be effected entirely by means upon the moving train or vehicle; or it may be effected by means upon the vehicle coöperating with means disposed along the path of travel of the train or vehicle.

For an illustration of some of many embodiments of my invention, reference is had to the accompanying drawing, in which:

Figure 1 is a diagrammatic view of electric circuit connections and arrangements together with a vertical sectional view through electro-magnetic controlling means and associated valve mechanism.

Fig. 2 is a horizontal sectional view, parts in plan, taken on the line X—X of Fig. 1.

Fig. 3 shows a modified form my invention may take.

Fig. 4 is a sectional view, partly in plan, taken on the line Y—Y of Fig. 3.

Upon the moving train or vehicle is disposed a cylinder C with which connects a pipe P which communicates with the air reservoir of the usual air braking system, air being confined in said reservoir under pressure. And with the cylinder C communicates a pipe T forming a branch of or a continuation of the usual train pipe which normally contains air at reservoir pressure, and exhaustion of which from the train pipe T causes the setting of the brakes in the well known manner.

The whistle W also communicates with the cylinder C through the pipe $w$.

Movable longitudinally within the cylinder C is the piston valve V having the shank or body $v$ carrying the piston heads $a$ and $b$, each of which may be provided with the packing ring $p$.

Between the piston heads $a$ and $b$ is disposed the vertically extending valve member $c$ carrying a bow spring $d$ engaging in a vertically extending slot $e$ in the valve shank or body $v$. The spring $d$ therefore presses the valve member $c$ against its seat, which is the interior surface of the cylinder C. Within the valve member $c$ is the passage $f$ terminating in the ports $g$ and $h$, which in the position shown communicates respectively with the interior of the pipes P and T, whereby equality of pressure between the ordinary main reservoir and the interior of the train pipe T is attained, with the result that the brakes are not applied. The member $c$, it will be noted, is somewhat shorter than the distance between the heads $a$ and $b$ with the result that there may be lost motion between the member $c$ and the valve V. Above the pipe P the wall of the cylinder C is cut away to form a port or passage $j$ which allows communication from the pipe P to the interior of the cylinder C above the head $a$. This port or passage $j$ is of restricted area, but nevertheless allows, in time, equality in pressure within the pipe P and the space within the cylinder C above the head $a$. This pressure is exerted upon the ball valve B which the air pressure assists in holding against its seats $s$ separated by recesses and disposed around the port $k$ communicating with the passage $m$ which communicates with the outer atmosphere. The seats $s$ are ground to accurately fit the ball B, which accordingly tightly closes the port $k$ and normally prevents escape of the air from within the cylinder C through the passage $m$. These seats $s$ are formed on a pole of the iron or other magnetizable core D of an electro-magnet whose winding is E and which may have the iron or other magnetizable cylindrical jacket F which may have the additional ball seats n which may also be magnetic poles. The cylinder C is closed by the cylinder head o which supports the electro-magnet, all the joints between the head and the electro-magnetic means being airtight, so that the only communication with the outer atmosphere is through the passage m.

Below the ball B is supported within the cylinder C a plate or bracket q having the ample air passages r and carrying the ball receiving arms t which, in the normal position shown, are only slightly below the ball B.

Associated with the electro-magnet is the permanent magnet M, one of whose poles coöperates with the jacket F and whose other pole coöperates with the core D, suitable adjustable magnetic shunting pieces u being associated with magnet M so that by their adjustment to and away from each other they may increase or decrease the magnetism set up in the core D and jacket F by the permanent magnet M.

The electro-magnet winding E is connected in circuit by conductors 1 and 2 with the adjustable resistance R, battery or other source of direct current S, the generator G of alternating, fluctuating or direct current, and the parallel connected branches, one of which includes the adjustable inductive resistance i and the indicator as an incandescent electric lamp Lg, and the other branch including the indicator or incandescent electric lamp Lr, in shunt with which may be connected, if desired, a voltmeter or other indicating instrument I. The rotary element of generator G is driven in definite relation with a vehicle wheel and therefore the generator speed varies with the vehicle speed.

The magnet winding E may be wound in such direction or so connected with respect to the source S that the ball seats s, are, for example, south poles, while the jacket poles n may be north poles. In such case the north pole of magent M is the one associated with the core D and the south pole of the permanent magnet M is associated with the jacket F. From this it will be understood that the magneto-motive force developed by the magnet M is opposed to the magneto-motive force developed by the coil E.

The operation is as follows:

When the train or vehicle is at rest, or traveling at a rate of speed below a predetermined limit, the magnetism produced by the winding E, only partially opposed by the permanent magnet M, and assisted by the air pressure exerted upwardly upon the ball B, such air pressure being that of the air in the reservoir, holds the ball B in its normal position shown against the seats s, thus closing the passage m. The air pressure itself is not sufficient to hold the ball in this position. The ball B being in its normal position against the seats, the piston valve V will be in its normal position shown with the train pipe T in communication with the reservoir through pipe P, and the space above the piston head a is also in communication with the reservoir through restricted passage or port j and the pipe P.

Should the speed of the train, however, increase beyond a predetermined limit, the frequency of the alternating current delivered by generator G will increase, as will also its voltage, and one-half wave of each cycle of alternating current will operate cumulatively with the battery S, while the other half wave will oppose the battery S, with the result that in the vehicle circuit there will be a fluctuating current which, at low speeds, will have small amplitude of fluctuation and variation, and will not reach or approximate at any time zero current. But as the vehicle speed increases the fluctuations of the current in the vehicle circuit will increase in amplitude, and during the existence of a half wave opposing the battery S will approximate, reach or pass below zero value, with the result that electro-magnet E will be so greatly weakened that it can no longer hold the ball B with the assistance of the air pressure in its normal position, and the ball will accordingly drop a short distance to the arms t on the bracket q. The permanent magnet M insures the dropping away of the ball B and prevents its being held by remanent or residual magnetism.

When the ball B drops the short distance to the arms t, the port k is uncovered and the air under pressure in the cylinder C above the piston a escapes to atmosphere through the passage m at a rate, depending on the size of the passage m as compared to the restricted passage j which allows the pressure within the cylinder C above the piston a to fall quite rapidly and to quite low valve, notwithstanding the continued connection through restricted passage j with the reservoir pipe P. And since the space between the piston heads a and b is in communication with the interior of the train pipe T, which is under reservoir pressure throught port h, passage f and port g, and the area of the lower face of the piston a is greater than the area of the upper face of the piston b, this pressure on the under side of the valve head a will exceed the total pressure upon the upper side of the head a, with the result that the piston V will rise, and in so doing will soon cause the lower head b to engage the lower end of the member c and carry it upwardly, until the upper surface of the head b reaches the upper edge of the port of the pipe T, where it communicates with the interior of the cylinder C. At this time the lower face of the head $b$ is above the lower edge of the port of the train pipe T, and the valve member $c$ has been raised to such position that the port $h$ is above the port of the pipe T, with result that the pipe T is cut off from the reservoir pipe P, and the air under pressure within the train pipe T exhausts into the cylinder C below the head $b$ and thence out through pipe $w$ through the whistle W, which is blown by the air so exhausting from the pipe T, the lower face of the valve head $b$ having risen above the opening of the pipe $w$ into the cylinder C and, as well understood in the art of air braking, this exhaustion of the air from the pipe T causes an application of the air brakes to the wheels of the train or vehicle, with the result that the vehicle speed is reduced, with resultant reduction in frequency and potential of the generator G. When the brakes have been applied for a period sufficient to reduce the vehicle speed below a predetermined limit, the voltage and frequency of the generator G will have fallen to such value that the current from the source S through the winding E will produce magnetism of sufficient strength to again pick up the ball B which has been separated only a very slight distance from the poles. The moment the ball B has been restored to its seat, the port $h$ is closed and the pressure below the ball B begins to rise, due to the continued communication with the reservoir pipe P through the restricted passage $j$. The air pressure accordingly gradually rises in the upper end of the cylinder C and eventually the pressure on the upper surface of the head $a$ will reach such value that the valve V will descend and finally restore the parts to the position illustrated, the communication of the pipe T with the pipe P through the valve member $c$ insuring lifting or releasing of the brakes.

Where the generator G produces fluctuating or alternating electro-motive force, as assumed above, the lamp $Lg$, of relatively low resistance, will always glow under the effects of the resultant of the electro-motive forces of the generator G and battery S. And accordingly, this lamp may be a green lamp for indicating that the vehicle circuit is intact and operative. As the speed of the vehicle increases, however, the frequency of the fluctuating or alternating electro-motive force delivered by generator G increases, and since there is inductive resistance $i$ in the branch circuit including the lamp $Lg$, the current through the lamp $Lg$ will tend to remain constant, with corresponding substantial constancy in brilliancy of lamp $Lg$, or, at least, the current through the lamp $Lg$ will increase at relatively slow rate with increasing vehicle speed. But in the case of the lamp $Lr$, which is preferably of high resistance as compared with the resistance of the lamp $Lg$, and being in a substantially non-inductive branch in shunt to the inductive resistance $i$ and lamp $Lg$ or in shunt to inductive resistance $i$ only, with increasing vehicle speeds and consequent increasing frequency and electro-motive force of the generator G will begin to glow and will become brighter and brighter as the vehicle speed approaches or reaches the predetermined limit. For this purpose the lamp $Lr$ may be a red lamp, for example, and as it glows brighter and brighter will indicate to the engineman or driver that he is approaching the speed limit. In parallel with the lamp $Lr$ may be the indicator or voltmeter I which will form another visual indicator of the speed conditions.

When the generator G produces direct current, its electro-motive force will be opposed to that of the source S and as the vehicle speed reaches the predetermined limit will oppose the source S to such extent that the magnetism produced by the winding E will be so small that it will no longer be able, with the assistance of the air pressure, to retain the ball B, which will then drop a short distance to the arms $t$, whereupon the brakes will be set as before described. And when the vehicle speed has diminished suitably, the valve V will again return to normal position and release the brakes, and at such lower speed the opposing electro-motive force produced by the generator G will be insufficient to prevent the source S from passing current of sufficient magnitude through the winding E to attract ball B to its normal position, which occurs, of course, before the descent of the valve V.

The generator G may be a dynamo-electric generator whose moving element is geared to or attached to some rotating element of the train, as, for example, a locomotive or car wheel.

It will be understood, however, that the generator G may be omitted and that it may be replaced by a coil or coils carried by the train or vehicle and influenced by induction by means located in the path of travel of the vehicle or train, as in Fig. 3.

In the modification illustrated in Figs. 3 and 4, like reference characters refer to like parts in Figs. 1 and 2.

The cylinder C is closed at its upper end by the head $a^1$ having the port $b^1$ and the ball seat $e^1$ in which, under normal conditions, the ball $B^1$, which in this case may be of non-magnetic material, rests and closes the port $b^1$ which communicates with the space above the piston which is subjected to reservoir pressure. Above the ball $B^1$ is the armature disk or plate $d^1$ having the ball seat $e^1$. Conical springs $f^1$ and $j^1$ engage the top of the ball $B^1$, and the armature $d^1$, respectively, and are adjustable by the screws $c^2$.

The armature $d^1$ is adapted for vertical movement within the cylinder $g^1$ through whose end extend the adjustable screws $h^1$ engaging loosely in holes in armature $d^1$, these screws or pins serving as armature guides. Through the wall of cylinder $g^1$ extend the ports or passages $k^1$ either or both of which may be provided with means for adjusting or regulating their opening or area.

Embracing the upper end of the cylinder C are the two pole pieces $m^1$ and $n^1$, of any suitable shape, but here illustrated as somewhat less than a semi-circle in extent, as seen from Fig. 4. Magnetically connecting with these pole pieces are the electro-magnet cores $o^1$ and $p^1$ respectively, a ring shaped yoke or back armature $q^1$ being associated therewith.

The pole pieces $m^1$ and $n^1$ may be held in suitable position on the cylinder C by any suitable means, and they may be screw threaded to receive the screw threaded cylinder $g^1$ which may be turned by a wrench engaging the nut $r^1$ cast thereon.

The cylinder $g^1$ and the head $a^1$ are preferably of non-magnetic material, as is also the cylinder C.

On the electro-magnet cores $o^1$ and $p^1$ are disposed the electro-magnet windings E connected in circuit with devices similar to those described in connection with Fig. 1.

Communicating with the interior of the cylinder C, above the piston, is a safety valve or pop valve $s^1$ which prevents rise in pressure above a predetermined limit.

The lower cylinder head is provided with a vent or passage $t^1$.

In the pipe $w$ is connected an adjustable valve $u^1$ for adjustably determining the rate at which the pressure within the train pipe T is reduced.

The circuit is similar to that described in connection with Fig. 1, except that the generator G, of Fig. 1, is supplanted by the wheel coils $v^1$ loosely enveloping the vehicle wheels $w^1$ of para-magnetic material, as iron or steel, connected by the axle $x^1$, which may be of similar material, the wheels $w^1$ traveling upon the usual iron or steel rails $y^1$ across which may extend the member $z^1$ of para-magnetic material, such as soft iron or steel, or which may be a permanent magnet laminated as illustrated. The soft iron or steel cores $a^2$ form a joint of low magnetic reluctance with the rails $y^1$ and with the member $z^1$ and are surrounded by the coils $b^2$ which may be connected in any suitable circuit.

It will be understood, however, that in place of the coils $v^1$ and the associated parts described, a generator such as G of Fig. 1 may be used.

The operation is as follows:

When the train or vehicle is at rest, or traveling at a rate of speed below a predetermined limit, the normally energized electro-magnet will exert an attractive force downwardly upon the armature $d^1$, which attractive force is assisted by the weight of the armature $d^1$ and the pressure of the springs $f^1$ and $j^1$ to hold said ball snugly against its seat $c^1$ closing the port $b^1$ against the reservoir pressure within the cylinder C above the piston. This pressure and the area of the port $b^1$ are such that the forces referred to are sufficient to hold the ball $B^1$ in its normal position described; and the relief valve $s^1$ prevents rise in pressure sufficient to lift the ball in opposition to those forces.

Should the speed of the train exceed a predetermined limit when passing the member $z^1$ in its path of travel, the rate of change of magnetic flux through the coils $v^1$ will be such that an electro-motive-force will be generated therein of a magnitude and direction such as to reduce the strength of the current through the magnet windings E to such degree, with corresponding reduction of magnetic attraction upon armature $d^1$, that the air pressure beneath the ball $B^1$ is sufficient to raise it allowing air to escape through the port $b^1$ and through the lower port $k^1$ and leakage past or through disk $d^1$ through the upper port $k^1$. This flow of air through the port $b^1$, once instituted as described, will prevent the ball $B^1$ from immediately returning to its seat $c^1$ even if the electro-magnet E shall have returned to normal degree of energization.

The air so passing through port $b^1$ exerts pressure on member $d^1$ which, acting as a loosely fitting piston in cylinder $g^1$, rises in opposition to springs $f^1$ and $J^1$.

The pressure being now reduced above the piston valve in cylinder C it will rise, as described in connection with Fig. 1, and move upwardly with it the valve $c$, cutting off communication between the train pipe T and the reservoir P, and when the lower piston head $b$ has risen above the lower edge of the port of train pipe T the train pipe T will exhaust through the cylinder C and pipe $w$, valve $u^1$ and the whistle W to atmosphere, reduction of train pipe pressure resulting in application of the brakes.

In the meantime air at reservoir pressure passes through the port $j$ but, the port $j$ being more restricted than the ports $b^1$ and $k^1$, the pressure above the piston valve will become gradually reduced and the member $d^1$ will then return the ball to its seat $c^1$, the electro-magnet assisting in returning the member $d^1$, it being remembered that the electro-magnet $E^1$ has only for a short time reduced in strength due to the inductive influence upon its circuit. When the ball $B^1$ reengages seat $c^1$ it is there held, as previously described, and the pressure above the piston valve again increases due to connection with the reservoir through port $j$, and the piston valve will then descend and return to normal position, as described in connection with Fig. 1. The resultant increase in pressure in the drain pipe P will accordingly result in automatic release of the brakes.

Notwithstanding the fact that the inductive effect on the circuit may be transient or of short duration, the application and release of the brakes are gradual, and the parts occupy sufficient time in the brake setting or applying action to cause suitable or desired reduction of vehicle speed.

It will be understood that one or both of the lamps L$r$ and L$g$ and inductance $i$ may be omitted when the circuit is inductively influenced as described in connection with Fig. 3. But when a generator G, particularly when delivering fluctuating or alternating current, is used as in Fig. 1 in place of the coils $v^1$, these lamps and their associated parts may be used as described in connection with Fig. 1.

It will be understood as to both Figs. 1 and 3 that in place of wheel coils $v^1$, a coil surrounding the axle $x^1$ may be used, or both wheel and axle coils connected in series may be used.

It will accordingly be understood that such coil or coils, supplanting the generator G, may be such as C or A of any of the figures of my prior application Serial Number 850,075, filed July 10, 1914. In other words, it will be understood that any of the vehicle circuits of my said prior application may include as a translating device, the electro-magnetic means herein illustrated as controlling the ball B or ball B$^1$. And it will accordingly be understood that the magnetism of the permanent or electro-magnet or magnets in the trackway may be controlled in response to traffic conditions of certain blocks, so that the ball B or B$^1$ will respond to even low vehicle speed if the vehicle is driven into a danger zone or an occupied block as well as in the case where it exceeds its predetermined speed limit, and in so doing passes over a track magnet or para-magnetic bar which induces in the vehicle circuit an electro-motive force sufficient to cause the ball B or B$^1$ to respond.

Then, in either case, whether the ball B or B$^1$ responds to an occupied or danger condition of a block or zone or responds to excessive speed, the air brakes will be applied automatically and will continue in application until the vehicle speed is sufficiently reduced.

And in this connection it will be understood that there may be in addition to any of the vehicle circuits of my said prior application an additional vehicle circuit of the character of either herein illustrated and described, so that not only will the brakes be automatically applied and released, under the conditions herein described, but the brakes may be set, as by the arrangements of my said prior application, to bring the vehicle completely to rest, as therein described.

Or either of the vehicle circuits herein described may be combined with any of the vehicle circuits of my prior application, that is, any of the vehicle circuits of my said prior application may include, in addition to the devices described in said application, the additional translating device and lamp and other indicators herein described.

It will be noted that the vehicle circuits herein described are closed and normally and continuously energized from the source S, with the result that should there be any break in the vehicle circuit the ball B or B$^1$ will respond, and in case generator G is employed both of the lamps will be extinguished, and with both forms of my invention the brakes will be applied and will not be automatically released, because the ball B or B$^1$ will in such case not be restored to its normal indicated position. In other words, a failure of the vehicle circuit is a failure on the side of safety in that the vehicle will be braked and stopped and cannot be re-started until the vehicle circuit is again intact.

Where the generator G produces fluctuating or alternating electro-motive force, the ball B, of iron or steel or other magnetizable material, may have a plating or coating of copper, silver, or other conductor of low resistivity, with the result that in such coating there will be produced, due to the fluctuating magnetism, eddy currents which will increase as the speed of the train and frequency of the generator G increases. These eddy currents assist in insuring that the ball B will drop. And such coating also serves the purpose of reducing the tendency of the ball B to stick to the magnetic poles, due to residual or remanent magnetism.

What I claim is:

1. The combination with a vehicle, of an air brake system thereon, valve mechanism held in normal position by pressure exerted on opposite sides having different areas, a member having a port communicating with a region of different pressure and with the space adjacent one of said sides, an armature member normally closing said port, magnetic means holding said armature in port closing position, means causing release of said armature member by said magnetic means at predetermined vehicle speed, whereby said port is opened and said valve mechanism causes application of the brakes, said magnetic means restoring said armature member to normal position in response to resultant change in vehicle speed, whereby said port is closed and said valve mechanism causes release of said brakes.

2. The combination with a vehicle, of an air brake system thereon, valve mechanism controlling said air brake system and held in normal position by pressure acting on opposite sides having different areas, a member having a port communicating with the space adjacent one of said sides and with a region of different pressure, an armature member normally closing said port, magnetic means and pressure exerted on said armature member holding the same in normal port closing position, means causing release of said armature member at predetermined vehicle speed, whereby said port is opened and said valve mechanism is moved to cause application of the brakes, said armature member being restored to normal port closing position in response to resultant change in vehicle speed, whereby said valve mechanism returns to normal position and releases said brakes.

3. The combination with a vehicle, of an air brake system thereon, valve mechanism controlling said system and held in normal position by pressure acting on opposite sides having different areas, a member having a port communicating with a space adjacent one of said sides and with a region of different pressure, an armature member normally closing said port, an electro-magnet holding said armature member in normal position, a circuit including said electro-magnet, a source of unidirectional current and a generator of fluctuating or alternating current whose speed is dependent upon the speed of said vehicle, said magnet releasing said armature member at predetermined vehicle speed, whereby said port is uncovered and said valve mechanism moves and causes application of the brakes, said armature member being restored to normal position in response to resultant change in vehicle speed, whereby said port is closed and said valve mechanism returns to normal position to release said brakes.

4. The combination with a vehicle, of an air brake system thereon, valve mechanism controlling said air brake system to apply and release the brakes, electro-responsive means controlling said valve mechanism, a circuit controlling said electro-responsive means including an alternating current generator whose speed is dependent upon the speed of said vehicle, lamps connected in parallel with each other subjected to the effects of said generator, one of said lamps glowing at all vehicle speeds, and another of said lamps glowing at all vehicle speeds above a predetermined speed.

5. The combination with a vehicle, of an air brake system thereon, valve mechanism controlling said system and held in normal position by pressure acting on opposite sides having different areas, a member having a port communicating with the space adjacent one of said sides and with a chamber, a member in said chamber normally closing said port, an armature member resting on said first named member, magnetic means coöperating with said armature, means controlling said magnetic means in response to predetermined vehicle speed to release said armature, whereby pressure lifts said member to open said port whereby pressure on said one side is reduced and whereby said valve mechanism moves and causes application of the brakes, said member returning to normal port closing position after predetermined reduction of said pressure, whereby said valve mechanism returns to normal position and causes release of said brakes.

In testimony whereof I have hereunto affixed my signature in the presence of the subscribing witnesses.

GEORGE P. FINNIGAN.

Witnesses:
A. S. MARSH,
E. A. LYONS.